United States Patent [19]
Huber et al.

[11] Patent Number: 4,632,795
[45] Date of Patent: Dec. 30, 1986

[54] METHOD AND APPARATUS FOR EXTRUSION PROCESSING OF CELLULOSE BEARING MATERIALS

[75] Inventors: Gordon R. Huber; Bobbie W. Hauck, both of Sabetha, Kans.

[73] Assignee: Wenger Manufacturing, Inc., Sabetha, Kans.

[21] Appl. No.: 670,138

[22] Filed: Nov. 13, 1984

Related U.S. Application Data

[63] Continuation of Ser. No. 444,807, Nov. 26, 1982, abandoned.

[51] Int. Cl.[4] .............................................. B29B 7/42
[52] U.S. Cl. ................................... 264/115; 264/40.5;
366/88; 366/90; 425/202; 425/207; 425/208;
425/376 A; 425/376 B; 425/466
[58] Field of Search ..................... 264/40.5, 187, 115;
425/113, 149, 376 B, 381, 466, 208, 202, 206, 207; 366/88, 90

[56] References Cited

U.S. PATENT DOCUMENTS

| | | | |
|---|---|---|---|
| 3,035,306 | 5/1962 | Rossiter | 425/381 |
| 3,499,952 | 3/1970 | Kolner et al. | 264/40.5 |
| 3,650,652 | 3/1972 | Dray et al. | 425/208 |
| 3,701,512 | 10/1972 | Schippers et al. | 366/90 |
| 3,806,569 | 4/1974 | Gallard et al. | 425/149 |
| 3,983,862 | 10/1976 | Spriet | 425/113 |
| 4,060,368 | 11/1977 | Theysohn | 425/376 B |
| 4,118,164 | 10/1978 | Wenger et al. | 425/208 |
| 4,128,341 | 12/1978 | Hsu | 425/208 |
| 4,201,534 | 5/1980 | Plipps | 425/466 |
| 4,227,870 | 10/1980 | Kim | 425/208 |
| 4,304,539 | 12/1981 | Hagiwara et al. | 425/149 |
| 4,350,657 | 9/1982 | Jones et al. | 425/376 B |
| 4,359,435 | 11/1982 | Kogure | 264/40.5 |
| 4,408,725 | 10/1983 | Wenger et al. | 366/90 |

FOREIGN PATENT DOCUMENTS

| | | | |
|---|---|---|---|
| 0014125 | 8/1980 | European Pat. Off. | 264/40.5 |
| 0034505 | 2/1981 | European Pat. Off. | |
| 0569370 | 5/1945 | United Kingdom . | |
| 0657614 | 9/1951 | United Kingdom . | |
| 0659408 | 10/1951 | United Kingdom . | |
| 818088 | 8/1959 | United Kingdom . | |
| 1435379 | 5/1976 | United Kingdom . | |
| 2009028 | 5/1982 | United Kingdom . | |
| 2111397 | 7/1983 | United Kingdom . | |
| 0410969 | 3/1971 | U.S.S.R. | 425/149 |

OTHER PUBLICATIONS

"Principles of Wood Science and Technology II Wood Based Materials", by F. F. P. Kollmann, E. W. Kuenzi and A. J. Stamm Springer-Verlag Berlin Head., New York, 1975.

"More Than 200 Production Lines in 110 Fiberboard Mills Engineered and Delivered by Defibrator", Sunds Defibrator Brochure 309-105, E:6:80.

"Gravity Discharge Refiners", and Chip Steaming Tubes & Ancillary Equipment for TMP and MOF Systems.

"Model 50-1C/CP Refiners", 36/42—1CP Steam Pressurized Refiners, Refining Systems for the Board Industry, Sprout Waldrow Bulletin 1400, 1446, 1431, 1430 and 8007, respectively.

*Primary Examiner*—Jeffery Thurlow
*Attorney, Agent, or Firm*—Schmidt, Johnson, Hovey & Williams

[57] ABSTRACT

An improved, low cost, energy efficient extrusion device and method for processing of cellulose- or fiber-bearing materials (e.g., wood chips, crop residues, whole or ground soybeans) is described which includes a transition screw section designed to smooth out material flow through the extruder and allow creation of increased barrel pressure and temperature levels. The transition section includes first and second alternating flights, with the depth of the first flight being less than that of the second flight and preferably gradually increasing until it equals the second flight depth. The overall extruder apparatus also advantageously includes a single flighted inlet screw section and a double flighted compression screw section respectively disposed on opposite sides of the transition section; in addition, the extruder has a pressure responsive adjustable die so that the effective dimensions of the die opening can be varied during the extrusion operation. Extrusion of wood chips to produce a defibrated wood product useful in the manufacture of fiber board or paper products can be accomplished according to the invention with a per ton energy consumption substantially below that of conventional processes.

7 Claims, 6 Drawing Figures

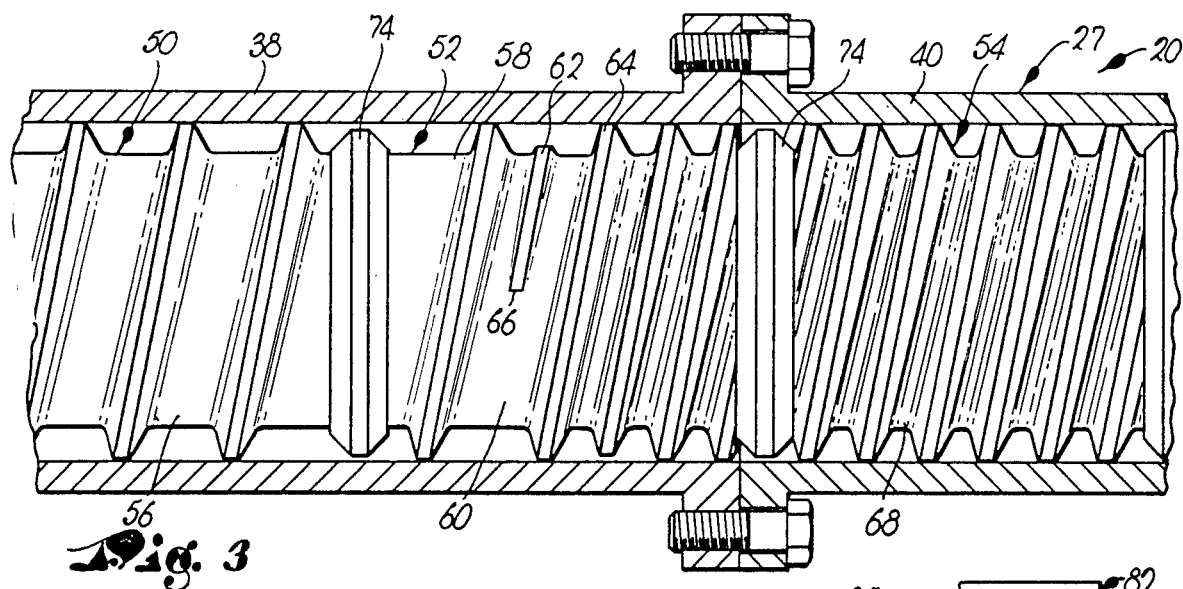
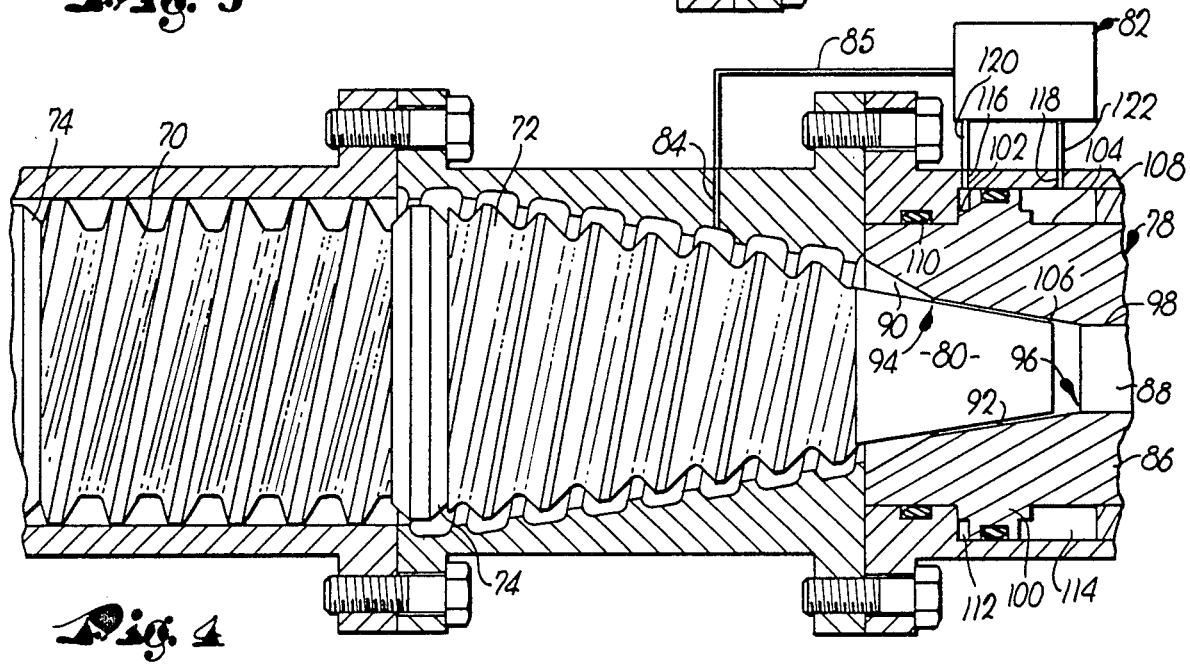
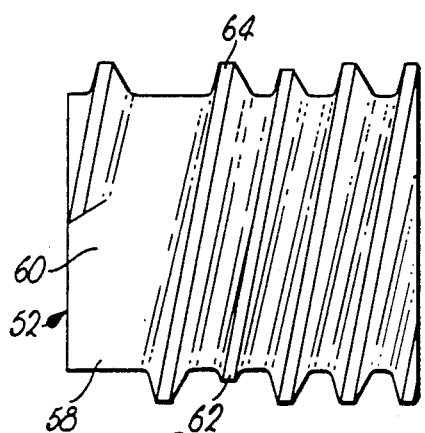
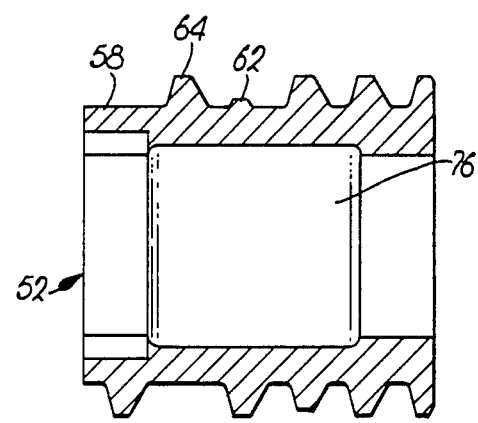

METHOD AND APPARATUS FOR EXTRUSION PROCESSING OF CELLULOSE BEARING MATERIALS

This application is a continuation of application Ser. No. 444,807, filed Nov. 26, 1982 now abandoned.

BACKGROUND OF THE INVENTION

1. Field of the Invention

The present invention is broadly concerned with an extrusion apparatus and method designed to efficiently handle and extrude material heretofore presenting extreme processing problems such as wood chips, sawdust and other woody residues, municipal solid waste, and crop residues. More particularly, it is concerned with such a device and method which makes use of a transition screw section within the barrel which serves to even out material flow and assist in buildup of relatively high pressures and temperatures; moreover, the overall extrusion apparatus preferably includes an adjustable die which further facilitates the extrusion operation.

2. Description of the Prior Art

A number of processes and devices have been proposed in the past for the purpose of restructuring cellulose- or fiber-bearing materials to produce a comminuted or defibrated product. To give but one example, defibrated wood is used in the production of so-called fiber board. The defibrated wood can be produced by a technique known as "gun puffing" wherein wood chips are treated with high pressure steam in a large vessel followed by a sudden release of pressure to separate and restructure the wood chips into fibers and thus obtain the defibrated product. Another type of process to achieve this result involves disc refining of wood chips wherein, after an initial pressure treatment, the wood chips are conveyed to a large multiple disc refiner which is likewise operated under pressure. Large commercial units of this type are capable of refining wood chips down to essentially single fiber size, but for this purpose require a very large motor, e.g., two thousand horsepower. One significant problem with disc refiners is maintenance and parts replacement costs. These units are prone to wear out critical operating components at a rather considerable rate, and are therefore deficient.

Treatment of municipal solid waste has also been practiced in the past in order to render this material uniform and usable as a fuel. One technique for treatment of municipal solid waste is known as hydropulping. In this process, a slurry of the waste and water is introduced into a large kettle having a perforated bottom. A rotating scraper blade is situated adjacent the perforated bottom, and serves to reduce and restructure the solids passing through the kettle bottom.

Generally speaking, all of the processes mentioned above are deficient in one important respect, i.e., they consume large amounts of energy. For example, the disc refining process for wood chips, although effective for producing the desired defibrated wood, can be almost prohibitively expensive from an energy requirement standpoint. This stems not only from the inherent electrical power consumption of the large driving motor and steam used in treatment of woodchips, but also from the fact that large volumes of water must be pumped and handled along with wood chips.

Attempts have been made in the past to extrusion process wood chips or other cellulose- or fiber-bearing materials. Theoretically, the advantages of extrusion processing of these materials are manifest, particularly from the standpoint of energy consumption. However, severe problems are encountered in practice, stemming principally from the great difficulty in smoothly and efficiently extruding rough, coarse materials such as wood chips. Typically, attempts to extrude wood chips result either in excessive surging and blowing or other signs of uneven operation, or perhaps more often complete plugging of the machine, necessitating a break down and cleanup of the machine. In view of these problems, it is believed that no commercially successful extrusion apparatus or process has heretofore been developed which can effectively restructure and defibrate cellulose- or fiber-bearing materials.

SUMMARY OF THE INVENTION

The present invention overcomes the problems noted above and provides an extrusion apparatus and method which is specifically designed to handle, without the usual problems, materials such as wood chips, sawdust and other woody residues, including municipal solid waste and crop residues (e.g., wheat straw, corn stover, bagasse). In addition, the extruder hereof has been used to process and texturize whole soybeans having the usual high fat content.

Broadly speaking, the extruder of the present invention includes an elongated barrel presenting a material inlet and a material outlet adjacent opposed ends thereof, with an elongated, axially rotatable screw within the barrel which serves to advance the material from the inlet end to the outlet end thereof. The screw is especially designed for smoothing out material flow in the machine so as to minimize formation of an unmanageable plug of material. This feature, coupled with die means adjacent the outlet end of the barrel which is variable to alter the effective dimensions of the die opening during operation of the extruder, has been found to materially facilitate processing of materials of the type described.

Advantageously, the extruder screw presents a first single flighted (i.e., only one helical flight per screw section) inlet screw section adjacent the inlet end of the barrel, a transition screw section upstream of the inlet screw section which includes first and second flights each presenting a series of helical portions. The portions of the first and second flights alternate along the length of the transition screw section, and the depth of the first flight is less than that of the second flight. Finally, the screw further includes a compression screw section downstream of the transition section which extends toward the outlet end of the barrel. The compression screw section is of double flight or triple flight construction to increase compression forces on the material.

In particularly preferred forms, the depth of the first flight on the transition screw section gradually and progressively increases until it equals that of the second flight. In practice, the first flight starts at essentially zero depth and gradually increases to that of the second flight during about one-quarter revolution to 10 revolutions of the first flight, although a greater or lesser number of revolutions could be employed. In this preferred configuration, the root diameter thereof is constant or varied throughout its length.

In preferred forms, the adjustable die structure is pressure-responsive, i.e., the effective dimensions of the die opening are adjusted in response to fluctuations in barrel pressure. This has been found to enhance the operational characteristics of the extruder device.

BRIEF DESCRIPTION OF THE DRAWINGS

FIG. 3 is an enlarged, fragmentary vertical sectional view taken along line 3—3 of FIG. 2 and illustrating the inlet, transition and compression screw sections of the extruder screw;

FIG. 4 is an enlarged, fragmentary vertical sectional view at the outlet end of the extruder apparatus, and depicting the preferred adjustable die structure;

FIG. 5 is a side elevational view of the preferred transition screw section and illustrating the gradual and progressive increase in flight depth of the first screw flight thereof; and FIG. 6 is a vertical sectional view of the section depicted in FIG. 5.

DESCRIPTION OF THE PREFERRED EMBODIMENT

1. The Extrusion Apparatus

Figure 1:
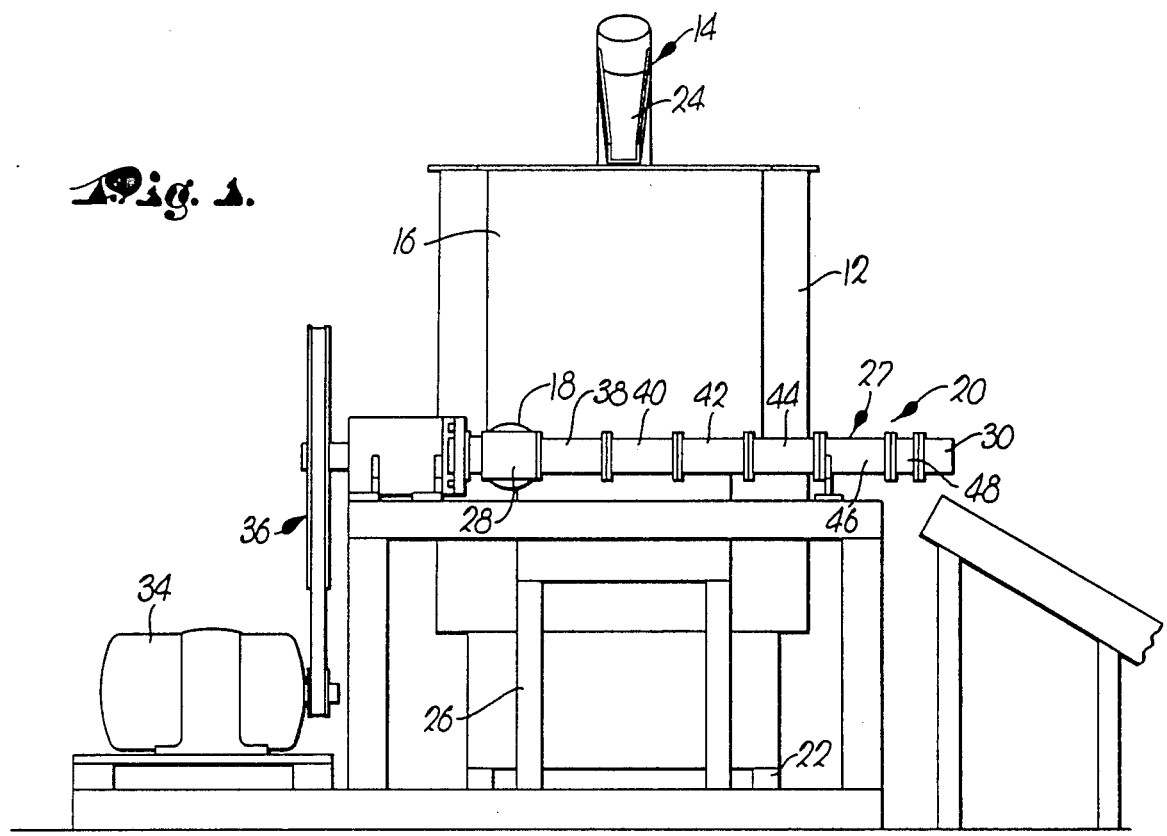
FIG. 1 is a side elevational view of extrusion apparatus in accordance with the invention.
Figure 2:
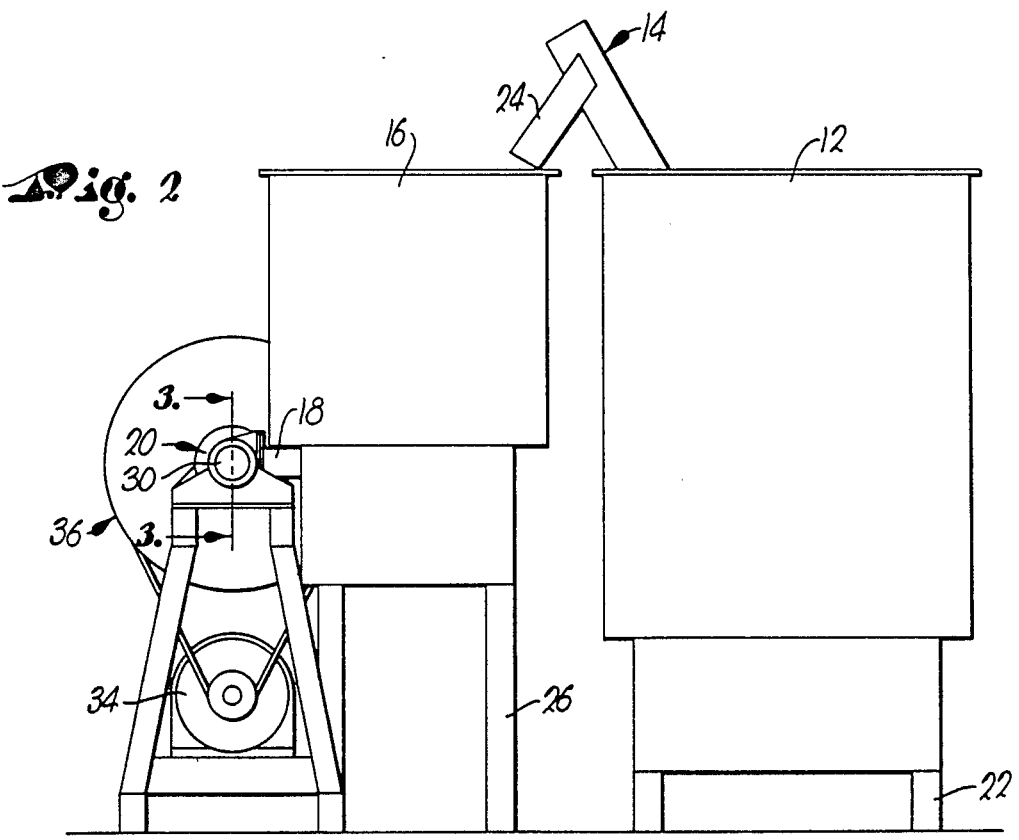
FIG. 2 is an end elevational view of the apparatus illustrated in FIG. 1.

Turning now to the drawings, an overall extrusion apparatus 10 is illustrated in FIGS. 1 and 2 which includes a primary feed hopper 12 provided with an inclined delivery auger 14, a secondary hopper 16 provided with a twin screw feeder mechanism 18, and an extruder assembly broadly referred to by the numeral 20. The hopper 12 is of conventional construction and includes the usual supports 22. The auger 14 is oriented obliquely within the confines of hopper 12 and extends upwardly through the open top thereof. A delivery chute 24 serves to convey material augered from the confines of hopper 12 into secondary hopper 16. The hopper 16 is likewise of known construction and includes supports 26 and an open top for delivery of material from chute 24. Both of the hoppers 12 and 16 are preferably provided with rotating scrapers adjacent the bottom thereof, so that agglomeration of material therein is prevented.

The extruder assembly 20 includes an elongated multiple section tubular barrel 27 having a material inlet 28 in communication with twin screw feeder 18, as well as adjustable die structure 30 positioned adjacent the opposite outlet end of the barrel.

The assembly 20 further includes an elongated, multiple section auger screw generally referred to by the numeral 32 which is situated within the barrel 27 and is axially rotatable therein through the medium of motor 34 and drive assembly 36. The screw 32 serves to advance material from inlet 28 along the length of barrel 27 and finally through the die opening presented by adjustable die structure 30; in addition, the screw serves to subject the material to shear forces and imparts heat to the material in the manner to be described hereinafter.

In the embodiment shown, barrel 27 is provided with a total of five axially aligned, interconnected, tubular heads 38–46, as well as somewhat shorter, internally spirally ribbed compression head 48 which presents a frustoconical bore therethrough. Finally, it will be observed that the assembly 30 is affixed to the outlet end of head 48 for receiving material therefrom (see FIG. 4).

The screw 32 is likewise made up of sections, which can broadly be referred to as an inlet feed section 50, a transition screw section 52, and a compression screw section 54. The inlet screw section 52 comprises a single flighted screw member 56 situated within tubular head 38 and serving to convey material from inlet 28 along the length of the barrel 27 to the transition section.

The transition screw section 52 is in the form of a specialized screw member 58 which is situated downstream of the screw member 56 and is coupled thereto. As best seen in FIG. 3, a steamlock die 60 is interposed between the screw members 56, 58. (This steamlock is preferred, but not essential in the extrusion apparatus.) The screw member 58 making up the transition screw section is advantageously in the form of an elongated body presenting a generally cylindrical outer face 60 and a constant or decreasing root diameter (of course, it would also be possible to employ a variable root diameter screw). Structure is provided which defines respective, axially spaced apart first and second flight means 62, 64 on the body which extend outwardly from the face 60 and generally helically along the length of the screw body. As illustrated in FIGS. 5 and 6, the first and second flight means 62, 64 in effect present a series of helical portions, with the portions of the first and second flight means alternating along the length of the body. Moreover, it will be observed that the depth (i.e., the distance from the face 62 to the outer surface of the flight) of the first flight means 62 is less than that of the second flight means 64. In the illustrated embodiment, the first flight means 62 starts at essentially zero depth and gradually and progressively increases, during a period of about one and one-quarter revolutions of the flight means, until the depth of the first flight means 62 equals that of the second flight means 64. This gradual increase in flight depth is best seen in FIGS. 5 and 6, whereas the starting or zero depth point 66 of the first flight means 62 is depicted in FIG. 3.

As will be explained in more detail hereinafter, the purpose of transition screw section 52 is to smooth out the flow of rough, coarse material passing through the extruder assembly to prevent plugging of the machine.

The compression screw section 54 in effect occupies the remainder of the length of the extruder barrel 27, i.e., this section 54 is disposed within heads 40–48. The compression screw section includes one or more double flighted screw members such as the screw members 68 and 70 respectively illustrated in FIGS. 3 and 4. Also, this section 54 includes the conical screw member 72 positioned within head 48 (see FIG. 4). If desired, respective steamlock dies 74 can be situated between the respective screw members making up the overall compression screw section 54.

It will be understood by those skilled in the art that the described screw members are of essentially tubular, sectionalized configuration and include a central bore. The overall extruder is typically equipped with a central, powered, rotatable splined shaft which receives the screw members making up the overall screw 32, as well as the steamlock dies. The tubular nature of screw member 58 is illustrated in FIG. 6 as at 76.

The die structure 30 includes an elongated, tubular, axially shiftable piston head 78, an elongated, axially rotatable bullet element 80 located partially within piston head 78, hydraulic means 82 operatively coupled to head 78 for selective axial shifting of the latter in either axial direction, pressure sensing means 84 operatively disposed within barrel 27 for sensing the pressure conditions therewithin, and coupling means 86 operatively coupling the pressure sensing means 84 and hydraulic means 82.

In more detail, head 78 includes a sidewall 86 and inner, bore-defining wall portions which cooperatively define a continuous bore 88 through the length of piston head 78. In particular, a first frustoconical wall portion 90 is provided which extends inwardly in a converging manner from the extreme input end of piston head 78. A second frustoconical wall portion 92 having a largest diameter end 94 and a smallest diameter end 96 is also provided, along with a third wall portion 98 of cylindrical configuration which extends from the smallest diameter end 96 of wall portion 92.

The wall portions 90 and 92 cooperatively define a frustoconical input end bore section, whereas wall portion 98 defines a cylindrical, substantially constant diameter output end bore section. It will further be observed that the diameter of the output end bore section is substantially equal to the diameter of the smallest end 96 of portion 92, and that it is free of any obstructions to material flow therethrough.

The outer surface of piston head 78 is of irregular construction and includes four circumferentially spaced, peripheral recesses (not shown) adjacent the output end of the head, and an annular, outwardly projecting structure 100 between the input and output ends of the head 78. Respective, smooth, cylindrical bearing surfaces 102, 104 extend in opposite directions from the opposed ends of the structure 100 for purposes which will be made clear.

The bullet 80 is of elongated, frustoconical configuration and is defined by a smooth, converging sidewall and a circular front wall. The largest diameter end of the bullet 80 extends from the smallest diameter end of the conical screw member 72, and in effect forms an extension of the latter. Thus, the bullet 80 rotates with the screw 72 during operating of the extrusion apparatus. Preferably, the bullet 80 is integral with the screw member 72.

Referring specifically to FIG. 4, it will be seen that the converging sidewall of bullet 80 is complementally configured relative to the wall portion 92, to thereby define an annular extrusion orifice or opening 106 between the bullet sidewall and wall portion 92. It will also be observed that the effective transverse dimensions of the opening 106 can be varied by axial shifting of head 78, in the manner to be explained.

The overall adjustable die structure 30 includes an annular, apertured, stationary member 108 which is bolted to the outlet end of compression head 48 as depicted. The innermost face of member 108 is of smooth, circular configuration and is provided with a circular recess receiving a seal 110. The member 108 is configured to define, in conjunction with the surfaces 102, 104 and the structure 100, first and second hydraulic fluid chambers 112, 114. A pair of bores, 116, 118, are provided through the member 108 and respectively communicate with the chambers 112, 114. Schematically illustrated hydraulic fluid lines 120, 122 are operatively coupled to the respective bores 116, 118 as illustrated.

The hydraulic means 82 is of conventional construction and has been illustrated only in schematic form. Those skilled in the art will appreciate, however, that the purpose of hydraulic means 82 is to direct hydraulic fluid under pressure to either of the bores 112, 114, depending upon the pressure conditions within barrel 27, as sensed by the sensor 84. To this end, the hydraulic means 82 includes the usual hydraulic fluid reservoir, hydraulic pump, and solenoid operated valves.

The sensor 84 is preferably in the form of a pressure transducer which is operatively disposed within an appropriate bore provided through the sidewall of compression head 48. Thus, the sensor is operable to detect the pressure conditions within the barrel 27 adjacent the inlet to the die structure 30. In the event that excessive pressure conditions are sensed within the barrel 27, hydraulic fluid is directed to chamber 112 which has the effect of shifting piston head 78 rightwardly as viewed in FIG. 4, to thereby increase the effective transverse dimensions of the extrusion opening 106, with the result that the pressure conditions are reduced. On the other hand, if a low pressure condition is sensed, hydraulic fluid is directed to the chamber 114, so that piston head 78 is shifted leftwardly as viewed in FIG. 4 to decrease the effective dimensions of the opening 106 and increase barrel temperature.

The die structure 30 described above is fully depicted and described in application for U.S. patent, Ser. No. 06/210,684, filed Nov. 26, 1980, now abandoned. The disclosure of this application is hereby incorporated by reference herein.

In addition, external hydraulic piston and cylinder assembly may be employed in lieu of or to assist the internal structure described for shifting of piston head 78.

2. The Extrusion Method

It has been discovered that extrusion of materials such as wood chips, wood-derived materials, paper, municipal solid wastes, crop residues and whole or ground soybeans can be materially enhanced through use of the described apparatus. Broadly speaking, the effect of the transition screw section, in conjunction with the adjustable die structure 30, is to even out flow of the material within the extruder barrel so as to avoid plugging. The transition screw section has been found to gradually increase the shear forces on the material between the low shear inlet section to the high compression section, whereas the adjustable die maintains good continuity of operation by correlating the size of the die opening with the quantity of incoming material and the shear and working conditions imposed thereon. These components greatly facilitate the sometimes troublesome extrusion of the rough, coarse materials described above. Indeed, actual tests using conventional extrusion apparatus to extrude wood chips resulted in plugging or inefficient operation, whereas an extruder in accordance with the invention handled the same feedstock without difficulty.

In the extrusion of cellulose- or fiber-bearing materials, it is preferable to add moisture to the material prior to or during the extrusion process in order to achieve a total moisture content (i.e., native moisture plus added moisture) of from about 5 to 75 percent by weight, and more preferably from about 30 to 50 percent by weight. During the extrusion, the temperature should be maintained within the extruder barrel at a level of from about 212 to 650 degrees Fahrenheit, and more preferably from about 300 to 400 degrees Fahrenheit. Likewise, the pressure conditions within the barrel should be above about 200 psi, more preferably from about 200 to 5,000 psi, and most preferably from about 750 to 1,500 psi.

The material during the extrusion should be retained within the barrel 27 for a period of from about 15 to 200 seconds, and more preferably for a period of from about 30 to 60 seconds. This is achieved not only by adjusting the rotational speed of the screw 32, but also by adjustment of the effective clearance of the extrusion opening 106 between the bullet 80 and wall portion 92 (e.g., between about 0.001 inch to 0.500 inch, preferably 0.010 inch to 0.200 inch). As noted above, such adjustment is most advantageously effected in response to pressure conditions within the barrel.

In the extrusion of wood chips to produce a defibrated product useful for the production of fiberboard, wood chips of appropriate average dimension (e.g., one inch) are taken on an as is basis without any presoaking or premoisturizing and are passed into the barrel of extruder assembly 20. However, it could prove advantageous in some types of wood to premoisten the wood. The wood can be of virtually any type, such as hardwoods and softwoods. Exemplary woods include gum, aspen, poplar, pine or walnut, and will typically have a moisture content of from 20–60% by weight. The extruder would normally be operated at an rpm level of 75 to 600, preferably 150 to 300 rpm.

During the initial startup, the machine will typically experience surging and blowing, and such is controlled by varying the effective dimensions of the die opening until this opening effectively correlates with the feed rate of wood chips to the machine. When continuous operations have been established, the die assembly 30 is set to adjust the die opening when the pressure conditions within barrel 27 vary significantly from e.g., 1,000 psi. This setting level can be varied over a considerable range, depending upon the type of final product desired, such as smaller or larger particle size.

The extrusion of municipal solid waste and crop residues is essentially similar to that outlined above. Typically, the total moisture content of such feedstocks should average about 40% by weight, and the pressure setting for the die structure is usually around 1,000 psi.

We claim:

1. An extruder, comprising:
   an elongated, tubular barrel including an inlet end and an outlet end and presenting an inner surface along the length thereof;
   die means adjacent said outlet end; and
   an elongated, axially rotatable, flighted screw situated within said barrel, said screw including an inlet section adjacent said inlet end, a compression section adjacent said outlet end and die, and a transition section between the inlet and outlet sections,
   said compression section including at least a pair of respective, outwardly extending helical flight means thereon,
   said transition section having respective, outwardly extending first and second helical flight means thereon,
   said first and second flight means of said transition section each having a series of helical portions, with the portions of the first and second flight means alternating along the length of the transition section,
   the outer periphery of said first flight means being closely adjacent said inner surface of said barrel,
   the outer periphery of at least a portion of said second flight means being spaced further from said inner surface of said barrel than said periphery of said first flight means, with the depth of said second flight means gradually and progressively increasing until the outer periphery of the second flight means equals that of the first flight means, and both of said peripheries are closely adjacent said inner surface of said barrel.

2. The extruder as set forth in claim 1, said depth of said second flight means increasing to that of said first flight means during about one and one-quarter revolutions to ten revolutions of the second flight means.

3. The extruder as set forth in claim 2, said screw section having a root diameter which is substantially constant throughout its length.

4. A method of producing a defiberated product suitable for the manufacture of fiber board or the like, said method comprising the steps of:
   providing a quantity of rough, coarse material selected from the group consisting of wood and wood-derived materials and having a moisture content of from about 5 to 75 percent by weight;
   passing said material into the elongated barrel of an extruder, and axially rotating the extruder screw to convey said material along the length of the barrel,
   said conveying step including the steps of gradually increasing the shear and compression forces exerted on said material as the material passes along the length of said barrel, developing a temperature within said extruder barrel of from about 212° F. to 650° F., developing a pressure within said barrel of from about 200–5000 psi; and
   extruding the material through a restricted orifice die assembly, said assembly including structure defining an elongated compression zone of decreasing cross-sectional area along the length thereof, and a rotatable element situated within said compression zone,
   said extrusion step comprising the steps of passing said material through said compression zone while simultaneously rotating said element therewithin, and adjusting the effective dimensions of said restricted orifice in response to pressure conditions within said barrel, so as to produce said defiberated product.

5. The method as set forth in claim 4, said moisture content being from about 30 to 50% by weight.

6. The method as set forth in claim 4, wherein said pressure is from about 750–1500 psi.

7. The method as set forth in claim 4, said material being retained within said barrel for a time period of from about 15–200 seconds.

* * * * *